P. FRANTSITS.
CAR MOVER.
APPLICATION FILED JAN. 18, 1922.
1,438,818.
Patented Dec. 12, 1922.
FIG_1_
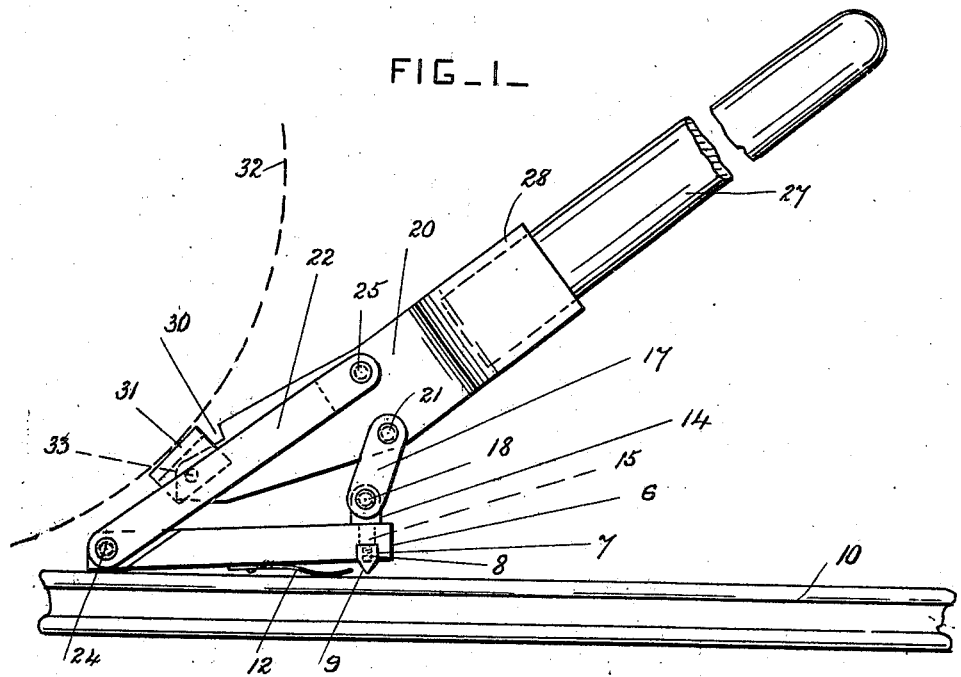
FIG_2_
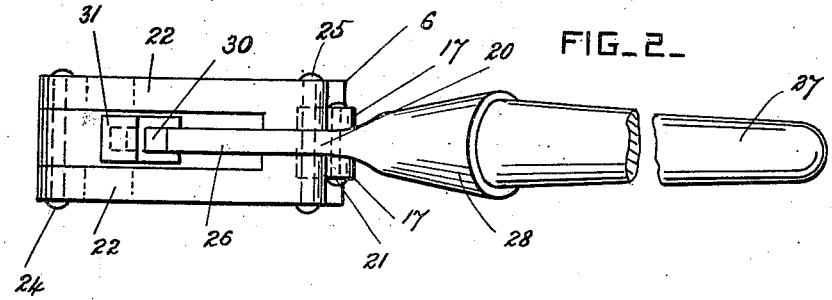
FIG_3_
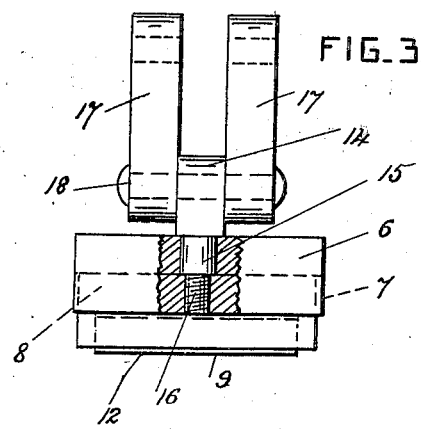
FIG_4_
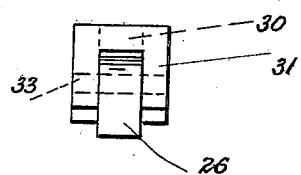
Inventor
Paul Frantsits
by Herbert W. Jenner.
Attorney Patented Dec. 12, 1922.

1,438,818

UNITED STATES PATENT OFFICE.

PAUL FRANTSITS, OF WILMERDING, PENNSYLVANIA.

CAR MOVER.

Application filed January 18, 1922. Serial No. 530,055.

*To all whom it may concern:*

Be it known that I, PAUL FRANTSITS, a citizen of German Austria, residing at Wilmerding, in the county of Allegheny and State of Pennsylvania, have invented certain new and useful Improvements in Car Movers, of which the following is a specification.

This invention relates to lever mechanism adapted to be applied to the wheels of railroad cars for the purpose of moving the cars along the rails by hand; and it consists in the novel construction and combination of the parts hereinafter fully described and claimed.

In the drawings, Figure 1 is a side view of a car mover constructed according to this invention. Fig. 2 is a plan view of the same. Fig. 3 is an end view of the base partially in section and showing the connection of the fulcrum lug and knife-edge bar. Fig. 4 is a detail end view of the shoe on the operating lever.

The base 6 is provided with a groove 7 at one end portion of its underside, and 8 is a bar inserted in the groove, and having a knife-edge 9 which projects from the groove, and bears on the rail 10 to keep the base from slipping. A spring 12 is secured to the base in front of the knife-edge, and normally holds the knife-edge out of contact with the rail so that the base can be slid along it with facility. The front end portion of the base rests on the rail.

A fulcrum lug 14 is provided and has a stem 15 which is secured in a hole in the base, and this stem has a projection 16 which is screwed into a screwthreaded hole in the bar 8 so as to retain it in the groove 7. Two short fulcrum links 17 are pivoted to the lug 14 by pins 18, which may be rivets or bolts; and an operating lever 20 is pivoted to the links 17 by a similar pin 21.

Two long upwardly and rearwardly inclined radius links 22 are pivoted by a pin 24 to the front end portion of the base, and 25 is a pin which pivots these links to the lever 20 above the fulcrum links. The front end portion 26 of the lever is arranged at an angle to its main portion, and its main portion is preferably formed of a removable handle 27 which is inserted in a socket 28 on the lever.

The front end portion 26 of the operating lever has a notch 30 in its top, and 31 is a forked shoe which engages with this notch and straddles the lever. The shoe is pivoted to the lever by a pin 33 near its front end, so that when pressed against the periphery 32 of a car wheel the shoe is tilted as shown in Fig. 1, and takes a good bearing against the wheel.

The knife-edge is pressed on the rail, and the wheel is moved forwardly along the rail when the handle is depressed; and the whole device is moved forwardly step by step as required to follow up the wheel.

What I claim is:

1. In a car mover, a base having a groove in one end portion, a bar arranged in the said groove and provided with a knife-edge for engaging with a rail, a fulcrum lug secured to the base and having a stem which is screwed into a hole in the said bar, and lever mechanism pivoted to the said lug and to the base and adapted to move a car wheel.

2. In a car mover, a base adapted to rest on a rail, short fulcrum links pivoted to the base at one end portion thereof, an operating lever pivoted to the said links, and long radius links pivoted to the base at its other end portion and pivoted to the operating lever above the short fulcrum links.

3. In a car mover, a supporting base, an operating lever, links pivotally connecting the operating lever with the base, and a forked shoe for engaging with the periphery of a wheel, said shoe being pivoted to the operating lever and straddling its front end portion.

In testimony whereof I have affixed my signature.

PAUL FRANTSITS.